C. H. & G. A. MALMQUIST.
VEGETABLE MASHER AND MIXER.
APPLICATION FILED MAY 3, 1909.
946,610.
Patented Jan. 18, 1910.
2 SHEETS—SHEET 1.
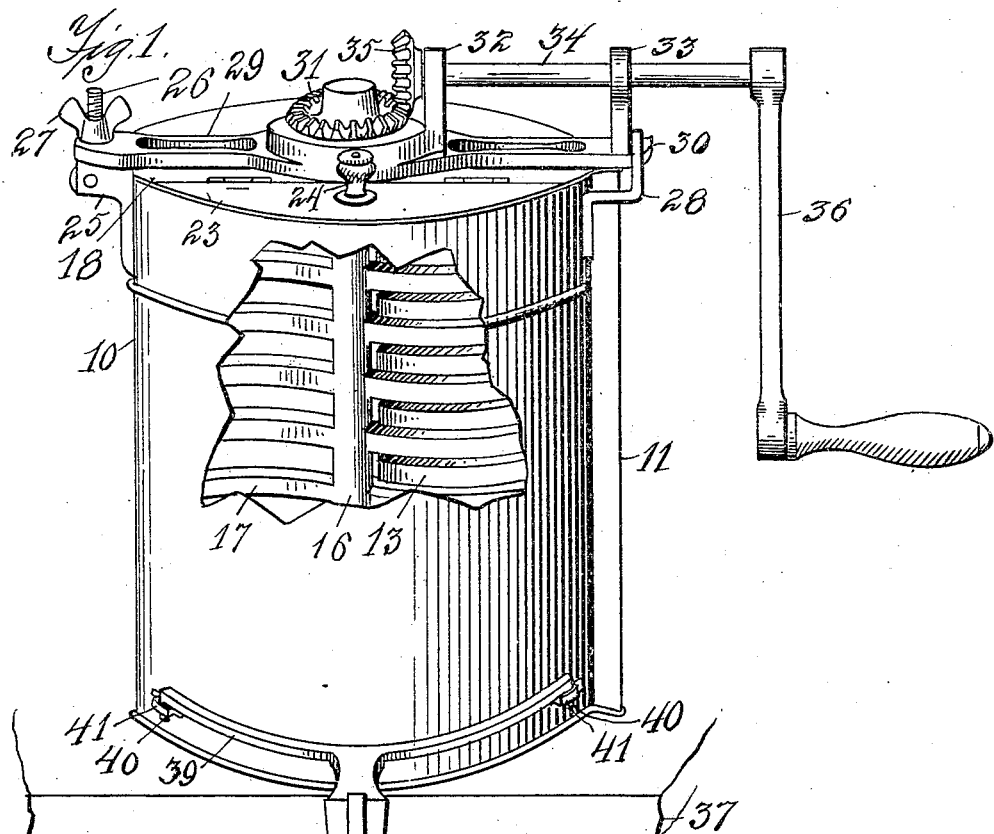
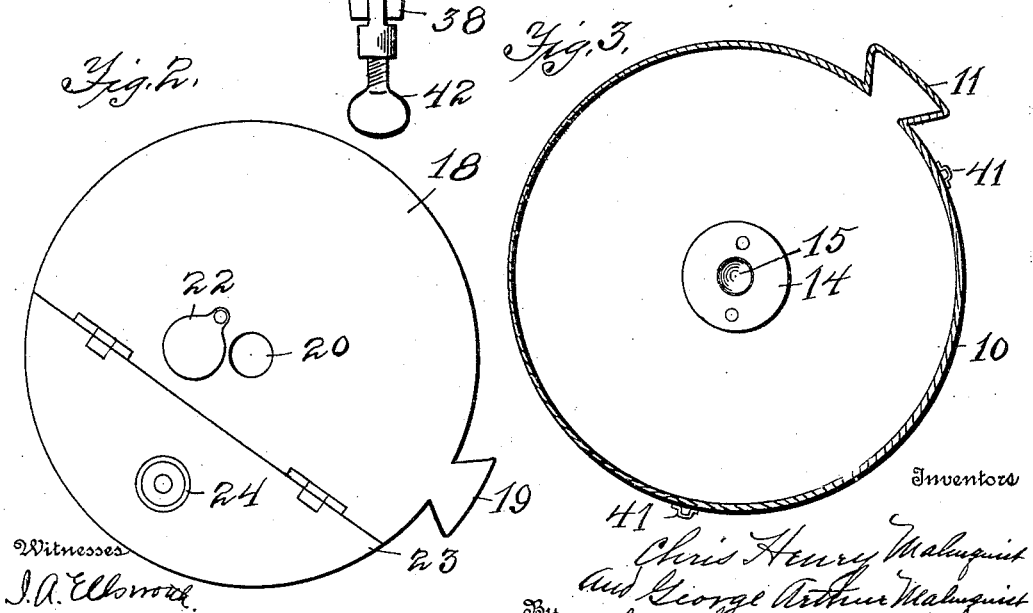

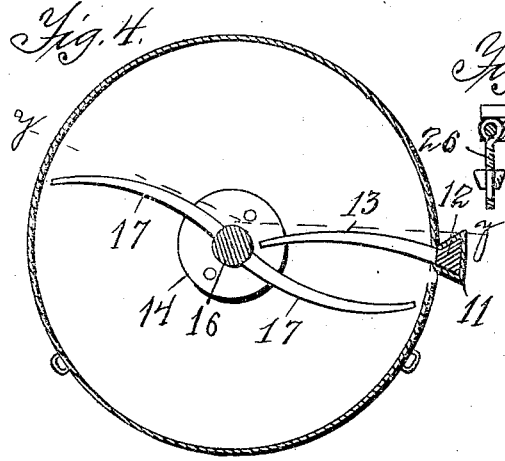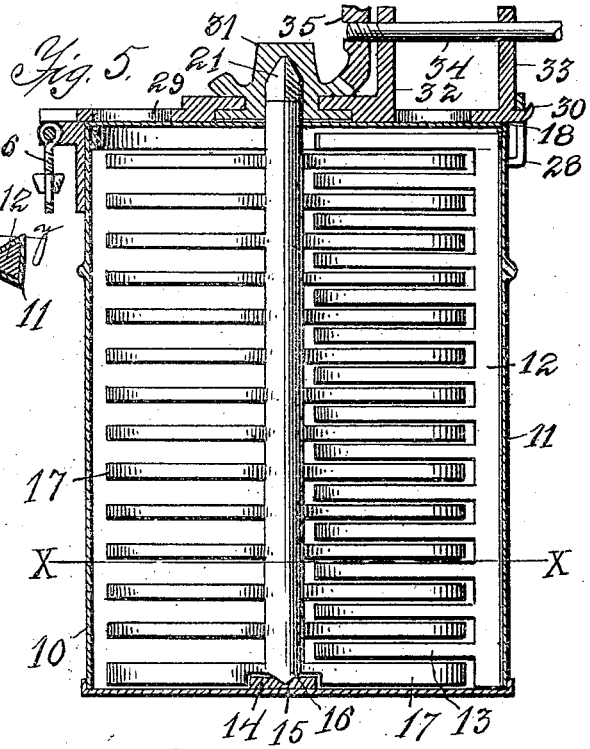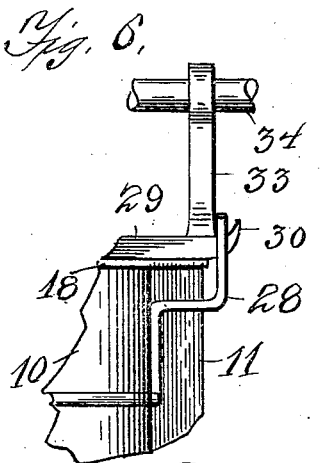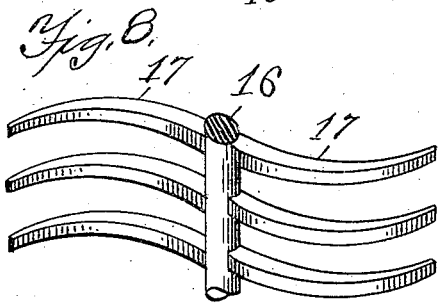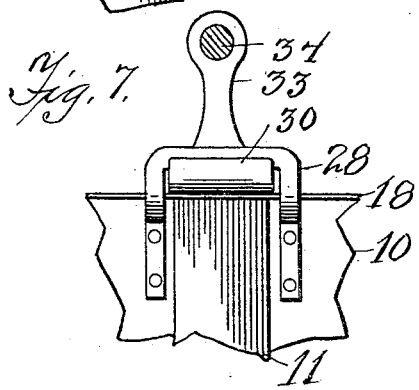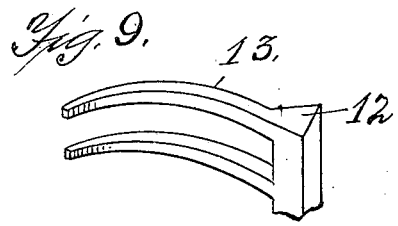

UNITED STATES PATENT OFFICE.

CHRIS HENRY MALMQUIST AND GEORGE ARTHUR MALMQUIST, OF JAMESTOWN, NEW YORK.

VEGETABLE MASHER AND MIXER.

946,610.  Specification of Letters Patent.  Patented Jan. 18, 1910.

Application filed May 3, 1909. Serial No. 493,559.

*To all whom it may concern:*

Be it known that we, CHRIS HENRY MALMQUIST and GEORGE ARTHUR MALMQUIST, citizens of the United States, residing at Jamestown, county of Chautauqua, and State of New York, have invented new and useful Improvements in Vegetable Mashers and Mixers, of which the following, taken in connection with the accompanying drawings, is a full, clear, and exact description.

The invention relates to machines for preparing vegetables for the table, including both the operations of mashing and mixing; and the improvement consists in the construction and combination of the parts, as shown in this specification and drawing, and pointed out in the claims.

In the drawings, Figure 1 is a perspective view of our device, the side of the receptacle being broken away to show the mixing and crushing mechanism within. Fig. 2 is a top plan view of the cover to the receptacle. Fig. 3 is a sectional view of the lower portion of the receptacle with the stationary and revoluble mixers removed; and Fig. 4 is a similar sectional view with the mixers inserted. Fig. 5 is a vertical sectional view of the receptacle and revolving mechanism at line Y Y in Fig. 4, showing a side elevation of the stationary and revolving mixers. Figs. 6 and 7 are elevations showing details of the manner of attaching a revolving mechanism for the mixer to the receptacle. Fig. 8 is a perspective view of a portion of the revolving mixer; and Fig. 9 is a similar view of a portion of the stationary mixer.

Similar numerals refer to corresponding parts in the several views.

The numeral 10 indicates the receptacle which is preferably made in cylindrical form, of sheet metal, as shown, having a dove-tail-shaped recess 11 formed vertically in the side thereof to receive therein the dove-tail-shaped butt of the stationary toothed mixing rack 12, the spaced teeth 13 extending out nearly to the center of the receptacle 10, and preferably in the curved form. A plate 14 is attached to the center of the bottom of the receptacle having a central depression 15 therein to revolubly receive the lower end of the toothed mixer or mixing rack 16. The spaced teeth 17 of the mixer 16 are preferably curved in the opposite direction from the stationary teeth 13 so as to gradually crush and mix the vegetable fiber between the oppositely curved teeth, the spaces between the teeth and the thickness of the teeth are arranged so that they fit fairly close to one another so as to mash and mix the vegetable fiber finely as the mixer 16 is rotated within the receptacle 10. It is apparent, however, that either of the mixers may be removed or inserted as desired. A cover 18 is provided for receptacle 10, which cover has a dove-tail-shaped projection 19 to fit and close the end of recess 11. Said cover preferably has a rim, which preferably extends within the receptacle. Cover 18 has a hole 20 centrally placed to receive the upper end 21 of the central shaft of the mixer 16, and a disk shaped piece 22 is pivotally attached at one side of opening 20 to cover the same when the receptacle is used for cooking. A segment 23 of cover 18 is hinged to the remaining portion and a suitable knob 24 is provided on said hinged segment in order that the vegetables may be observed while cooking or mixing without removing the entire cover.

In order to revolve the mixer 16, a crank mechanism is removably attached in the following manner: Lug 25 is attached to one side of the top of the receptacle having pivotally attached thereto the screw bolt 26 having a suitable thumb nut 27. On the opposite side of the receptacle a looped bracket 28 is attached to the side of the receptacle preferably each side of the dove-tail projection 11, in order to stiffen the receptacle and hold it all the more firmly. A bar 29 is provided which is slotted at one end to receive the pivotal screw bolt 26. The opposite end 30 is turned upwardly in the hooked form to catch beneath loop 28. Upper end 21 of mixer 16 is made square and extends into a square hole in the lower side of a bevel gear 31 mounted on bar 29. Part 29 also has the lugs 32 and 33 in which shaft 34 is revolubly mounted. Shaft 34 has a bevel gear 35 attached to one end and a crank 36 attached to the other. It is now apparent that end 30 of bar 29 may be hooked under loop 28 and upper end 21 of mixer 16 inserted in its opening in gear 31 after which the pivotal screw 26 is adjusted in the slotted end of the bar 29 and the thumb nut secures the bar firmly in place so that by turning crank 36 mixer 16 is swiftly revolved within receptacle 10.

In order to hold receptacle 10 firmly upon the table or support 37 a screw clamp 38 is provided having circular jaws 39 which extend a portion of the way around the receptacle 10, the outer ends 40 being extended downward to engage the loops 41 on the opposite sides of the receptacle. It is apparent that by inserting the points 40 in the loops 41 and turning screw 42 up against the under edge of the table top 37, the receptacle 10 will be firmly clamped to said table top.

It is obvious that the stationary and revoluble mixer may be removed from the receptacle 10, that the potatoes or other vegetables may be peeled and placed therein for cooking, that as soon as they are sufficiently cooked to require crushing and mixing the stationary mixer may be slipped endwise into the dove-tail-shaped opening 11 and will be firmly held therein, and the revoluble mixer 16 may be placed in the center of the receptacle 10, the cover 18 and revolving mechanism being put in place, the vegetables may be quickly crushed and mixed, proper seasoning materials having been supplied for the same, and as soon as they are properly crushed and mixed the stationary and revoluble mixers may be removed leaving the receptacle 10 to be used the same as in other cooking utensils for this purpose. It is also obvious that the stationary and revoluble mixers may remain in the receptacle 10 during the cooking process.

We claim as new:

1. In a machine of the character described, a receptacle having a vertical recess in its side, a stationary toothed rack removably mounted in the said recess, a toothed mixing rack revolubly and removably mounted in said receptacle, the teeth of said stationary and revolving racks curved in opposite directions and intermeshing, and means for turning said mixing rack.

2. In a device of the character described, a receptacle having a vertical dove-tail-shaped recess opening into said receptacle, a toothed rack having a dove-tail-shaped butt to slide into said recess and form a stationary mixer, a double toothed mixer revolubly mounted in said receptacle, the teeth of said stationary and revoluble mixers curved oppositely and formed to intermesh, and means for turning said revoluble mixer.

3. In a device of the character described, a receptacle 10, a dove-tail-shaped recess 11 vertical of the side of said receptacle and opening into the same, a stationary rack 12 having a butt to fit said recess and curved teeth 13 extending nearly to the center of said receptacle, a mixing rack 16 having oppositely placed rows of curved teeth 17 which intermesh with said stationary rack, said mixer revolubly and removably mounted in said receptacle, a cover 18 for said receptacle having a segment 23 hinged thereto, a bar 29 and means for removably holding said bar across the top of said receptacle and cover, beveled gears revolubly mounted on said bar, and a crank to turn said gears and turn said revoluble mixer, substantially as and for the purpose specified.

In testimony whereof we have signed our names to this specification in the presence of two subscribing witnesses.

CHRIS HENRY MALMQUIST.
GEORGE ARTHUR MALMQUIST.

Witnesses:
A. W. NETTLE,
I. A ELLSWORTH.